(12) United States Patent  
Cairns

(10) Patent No.: US 10,439,318 B2  
(45) Date of Patent: Oct. 8, 2019

(54) SEALED CONDUCTOR TERMINATION

(71) Applicant: PONTUS SUBSEA CONNECTORS LLC, Ormond Beach, FL (US)

(72) Inventor: James L. Cairns, Ormond Beach, FL (US)

(73) Assignee: Pontus Subsea Connectors LLC, Ormond Beach, FL (US)

(*) Notice: Subject to any disclaimer, the term of this patent is extended or adjusted under 35 U.S.C. 154(b) by 0 days.

(21) Appl. No.: 16/161,762

(22) Filed: Oct. 16, 2018

(65) Prior Publication Data

US 2019/0115685 A1    Apr. 18, 2019

Related U.S. Application Data

(63) Continuation of application No. PCT/US2017/027570, filed on Apr. 14, 2017.

(60) Provisional application No. 62/323,956, filed on Apr. 18, 2016.

(51) Int. Cl.
| | |
|---|---|
| H01R 13/52 | (2006.01) |
| H02G 15/013 | (2006.01) |
| H02G 15/04 | (2006.01) |
| H01R 13/516 | (2006.01) |
| H01R 13/523 | (2006.01) |
| H01R 13/58 | (2006.01) |
| H01R 4/70 | (2006.01) |

(52) U.S. Cl.
CPC ............ *H01R 13/521* (2013.01); *H01R 4/70* (2013.01); *H01R 13/516* (2013.01); *H01R 13/523* (2013.01); *H01R 13/5205* (2013.01); *H01R 13/5845* (2013.01); *H02G 15/013* (2013.01); *H02G 15/046* (2013.01)

(58) Field of Classification Search
CPC ... H01R 4/70; H01R 13/5205; H01R 13/5213
USPC ........ 439/521, 523, 587, 447; 174/151, 77 R
See application file for complete search history.

(56) References Cited

U.S. PATENT DOCUMENTS

| | | | | |
|---|---|---|---|---|
| 2,704,355 | A | * | 3/1955 | Holton ...................... F02P 7/04 174/77 S |
| 2,897,471 | A | * | 7/1959 | De Tar .................... H01R 13/53 439/275 |
| 2,904,769 | A | * | 9/1959 | Sampson ................ H01T 13/06 439/125 |
| 3,055,972 | A | * | 9/1962 | Peterson .............. H02G 3/0658 174/151 |

(Continued)

OTHER PUBLICATIONS

International Search Report and Written Opinion of International Application No. PCT/US2017/027570, dated Jun. 27, 2017.

*Primary Examiner* — Neil Abrams  
(74) *Attorney, Agent, or Firm* — Mark T. Vogelbacker

(57) ABSTRACT

An apparatus, combination and method of sealably enclosing junctions include an elastomeric seal that extends at least partially into a socket of a connector. The presently disclosed technology can be useful in sealably enclosing junctions of individual, jacketed-wire conductors to the terminals of underwater connectors. The presently disclosed technology can serve some or all of several purposes. A first of these purposes can be to sealably enclose a conductor-to-connector junction to prevent fluid ingress. A second purpose can be to electrically insulate a junction from its external environment, and a third purpose can be to provide strain relief for a jacketed-wire conductor at a junction.

14 Claims, 3 Drawing Sheets

(56) References Cited

U.S. PATENT DOCUMENTS

| | | | | | |
|---|---|---|---|---|---|
| 3,072,415 | A | * | 1/1963 | Lombard | F16L 5/06 277/622 |
| 3,221,292 | A | * | 11/1965 | Swanson | H01R 13/426 439/589 |
| 3,321,733 | A | * | 5/1967 | Thomas | H01R 13/53 439/271 |
| 3,388,368 | A | * | 6/1968 | Sauber | H01B 17/306 174/153 R |
| 3,842,387 | A | * | 10/1974 | Santangelo | F02P 7/022 439/130 |
| 3,905,672 | A | * | 9/1975 | Anhalt | B60T 8/171 439/281 |
| 3,961,127 | A | * | 6/1976 | Gear, Jr. | H02G 15/06 174/22 R |
| 3,963,295 | A | * | 6/1976 | Askman | H01R 13/53 439/276 |
| 3,994,553 | A | * | 11/1976 | Kornick | H01R 13/53 439/281 |
| 4,072,154 | A | * | 2/1978 | Anderson | A61N 1/3752 174/152 GM |
| 4,150,866 | A | | 4/1979 | Snyder, Jr. et al. | |
| 4,214,802 | A | * | 7/1980 | Otani | H01R 13/5221 439/275 |
| 4,306,760 | A | * | 12/1981 | Testa | G02B 6/3887 174/DIG. 8 |
| 4,560,219 | A | * | 12/1985 | Chapelot | H01R 13/5221 439/272 |
| 4,643,506 | A | * | 2/1987 | Kobler | H01R 13/5205 439/271 |
| 4,714,438 | A | * | 12/1987 | Williams | H02G 15/103 439/607.51 |
| 4,886,471 | A | * | 12/1989 | Fleshman, Jr. | H01R 13/443 439/587 |
| 4,892,488 | A | * | 1/1990 | Nestor | H01R 24/20 439/438 |
| 4,902,252 | A | * | 2/1990 | Whorton | H01R 13/53 439/723 |
| 4,904,198 | A | * | 2/1990 | Begitschke | H01R 13/53 439/184 |
| 4,948,377 | A | | 8/1990 | Cairns | |
| 5,267,869 | A | * | 12/1993 | Nadasky | H01R 13/53 439/125 |
| 5,562,471 | A | | 10/1996 | Kato | |
| 5,562,494 | A | | 10/1996 | Fujiwara | |
| 5,626,486 | A | * | 5/1997 | Shelly | H01R 13/53 439/273 |
| 5,781,681 | A | * | 7/1998 | Manning | G02B 6/3887 385/136 |
| 6,273,754 | B1 | * | 8/2001 | Bunch | H01R 13/405 439/587 |
| 6,633,720 | B1 | * | 10/2003 | Xu | G02B 6/4248 385/138 |
| 6,796,821 | B2 | | 9/2004 | Cairns et al. | |
| 7,690,936 | B1 | * | 4/2010 | Snekkevik | H01R 13/523 439/201 |
| 8,480,428 | B1 | * | 7/2013 | Sper | H01R 13/5213 439/521 |
| 9,583,867 | B2 | * | 2/2017 | Bergum | H01R 13/5213 |
| 2007/0117441 | A1 | | 5/2007 | Tanaka | |
| 2010/0075523 | A1 | | 3/2010 | Saitou | |
| 2010/0101835 | A1 | | 4/2010 | Aue | |
| 2013/0309888 | A1 | | 11/2013 | Nicholson | |
| 2019/0115685 | A1 | * | 4/2019 | Cairns | H01R 13/516 |

* cited by examiner

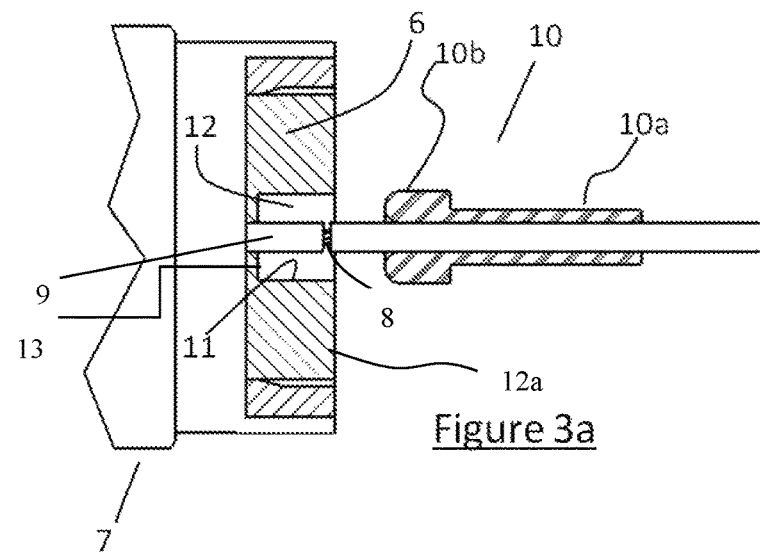
Figure 3a
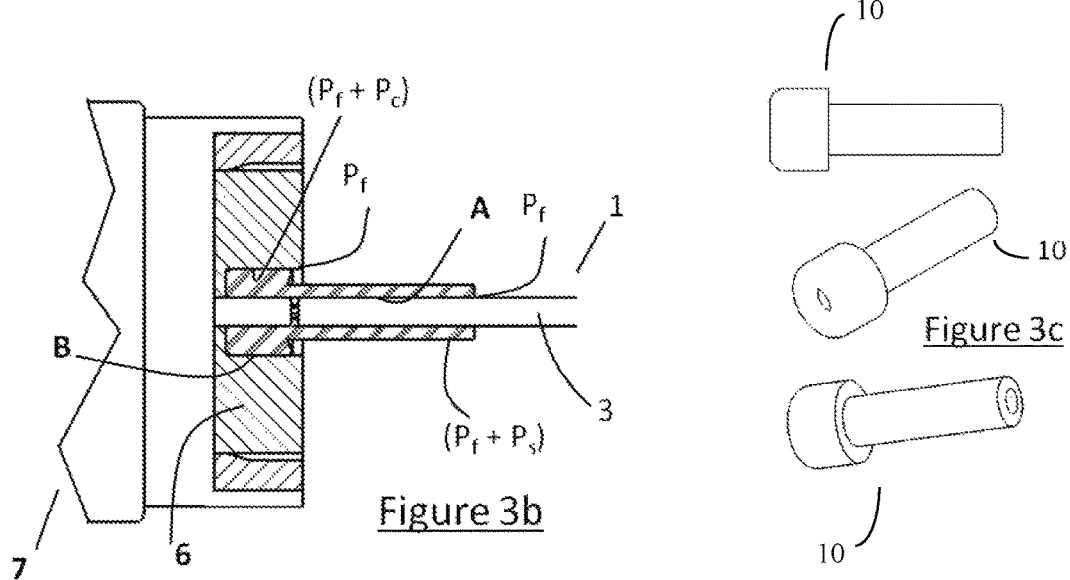
Figure 3b
Figure 3c

SEALED CONDUCTOR TERMINATION

This application is a continuation of International Application No. PCT/US2017/027570, filed Apr. 14, 2017, which claims benefit of U.S. Provisional Application No. 62/323,956, filed Apr. 18, 2016, both of which are herein incorporated by reference in their entirety.

FIELD

The present disclosure relates generally to sealably enclosing junctions. More particularly, the presently disclosed technology can be useful in sealably enclosing electrical junctions, such as electrical connections of individual, jacketed-wire conductors to the terminals of underwater connectors, instruments, or other devices.

BACKGROUND

Systems deployed in harsh environments often have junctions between cables and connectors or other devices, collectively referred to herein as "connectors," housed in chambers filled with non-conductive fluid, such as oil, in which the fluid pressure is nearly balanced to that of the operating environment. Where the operating environment is the deep sea, the fluid pressure can be extremely high. In some applications, the fluid-filled chamber includes a purpose-built, oil-filled hose with connectors attached to one or more ends thereof. Examples of such hose assemblies can be found in the commercial offerings of Teledyne Oil & Gas and Seacon, for instance. Where the conductor-to-connector junction is in an oil-filled chamber the junctions are often protected by "boot seals." The seals provide electrical insulation, and keep oil from escaping into the cable's interstices, such as the spaces between the strands of the conductor's jacketed wires. Such oil loss can quickly lead to chamber collapse and catastrophic termination failure. Representative examples of boot seals in oil-filled terminations can be found in U.S. Pat. Nos. 4,948,377; 6,796,821; and 7,690,936, copies of which are enclosed and incorporated by reference in their entirety.

Prior-art elastomeric boot seals include elastic sleeves that are stretched over dielectric nipples that protrude from or extend outwardly beyond the connector's terminal end, and simultaneously are stretched over the conductor-to-connector junction including the conductor's insulating jacket. Such a design is not ideal, as the protruding connector nipples are vulnerable to damage, and by extending from the connector's terminal end, the nipples add to the overall length of the junction, which is often not desirable. The protruding nipple and/or connector terminal of such a design can also undesirably add to the required diameter of the connector. FIGS. 1, 2a and 2b show typical electrical conductor 1, prior art boot seal 4, nipple 5, and connector 7. The drawbacks described above are inherent in the prior art shown in FIGS. 1, 2a, and 2b.

BRIEF DESCRIPTION OF THE DRAWINGS

Various embodiments of the present disclosure are described herein in by way of example in conjunction with the following figures, wherein like reference characters designate the same or similar elements.

FIG. 3a and FIG. 3b are partial axial quarter-section views of the invented boot seal disposed within a connector terminal-end socket according to one embodiment of the present disclosure.

FIG. 3c illustrates various perspective views of a first embodiment of a boot seal of the present disclosure.

DETAILED DESCRIPTION

Figure 1:
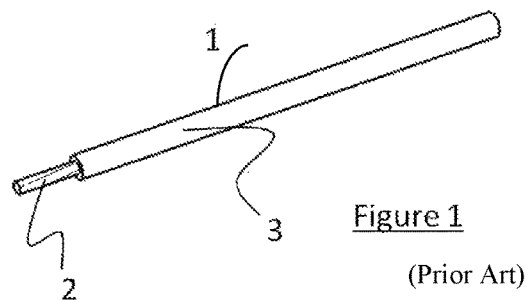
FIG. 1 is an oblique view of at least a portion of a typical jacketed electrical conductor segment.

It is to be understood that at least some of the figures and descriptions of the disclosure have been simplified to illustrate elements that are relevant for a clear understanding of the invention, while eliminating, for purposes of clarity, other elements that those of ordinary skill in the art will appreciate may also comprise a portion of the disclosure. However, because such elements are well-known in the art, and because they do not facilitate a better understanding of the invention, a description of such elements is not provided herein.

Certain terminology is used in the following description for convenience only and is not limiting. Certain words used herein designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

In various applications, it is desirable to reduce the size of the connection. Therefore, there is a need, in at least some situations, for boot seals that eliminate the need for protruding nipples, thereby minimizing the length and possibly the diameter of the connector upon which they are used. Eliminating protruding connector nipples also reduces the risk of accidental mechanical damage.

In one embodiment, the present disclosure can include an elastomeric seal generally in the form of the category commonly called "boot seals." Another element of an embodiment of the present disclosure can be a unique socket for sealably engaging the elastomeric seal.

The present disclosure can serve some or all of several purposes. A first of these purposes is to sealably enclose a conductor-to-connector junction to prevent fluid ingress. A second purpose is to electrically insulate a junction from its external environment, and a third purpose is to provide bending strain relief for a conductor at a junction. The last of these is particularly important in the case where conductors are of very small diameter.

FIG. 1 shows a typical jacketed electrical conductor or cable, generally designated 1, that includes stranded wire 2 within and/or extending at least partially outwardly from insulating jacket 3.

Figure 2A:
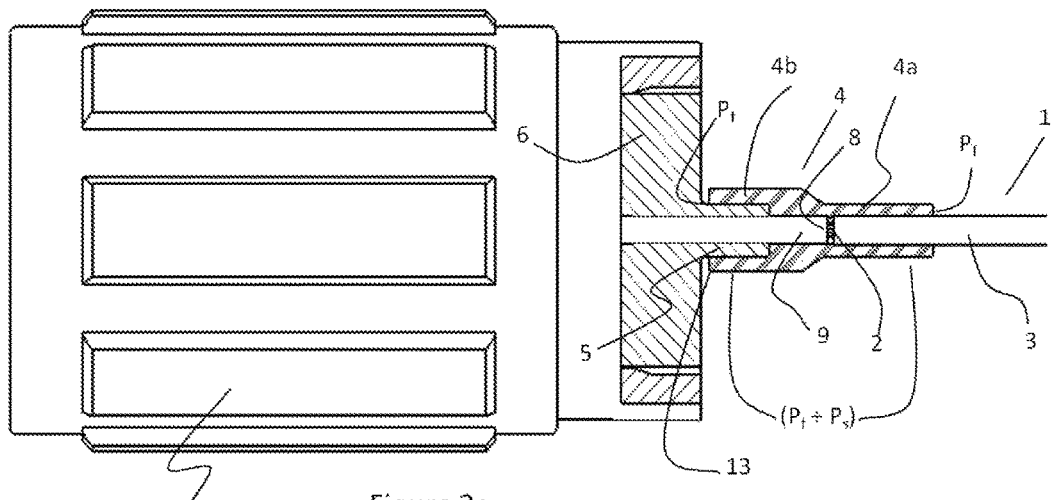
FIG. 2a is a partial axial sectional view of a typical prior-art boot seal disposed on a connector terminal-end nipple.
Figure 2B:
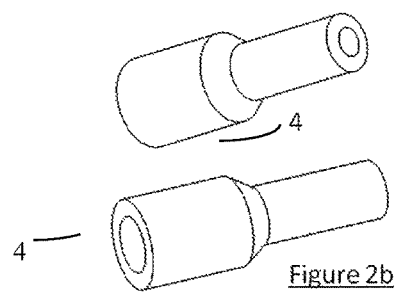
FIG. 2b illustrates various perspective views of a prior-art boot seal.

Examples of common elastomeric termination boot seals can be seen in the commercial subsea product offerings of DP Seals, Ltd. As shown in FIG. 2a, typical prior-art boot seal 4 can be installed on the terminal end of underwater connector 7. Prior-art elastomeric boot seal 4, including rearward sleeve portion 4a, is constrictively stretched over at least a portion of insulating jacket 3 of conductor 1. Forward sleeve portion 4b of boot seal 4 is stretched over boot seal nipple 5, which protrudes outwardly from base portion 6 of connector 7 to define an elastically-stretched fit against the outer surface of boot seal nipple 5. Boot seal nipple 5 extends over at least a portion of connector terminal 9 of connector 7, but at least a portion of connector terminal 9 extends outwardly beyond boot seal nipple 5. Boot seal nipple 5 is typically made from a rigid dielectric material, such as Ultem™ or polyetheretherketone (PEEK). When in place, boot seal 4 encloses junction point 8 where wire 2 is joined to connector terminal 9. FIG. 2b shows two perspective views of boot seal 4 in detail.

For purposes of this discussion, it is supposed that the junction of cable 1 to connector 7 is housed in a fluid, such as in an oil-filled and pressure balanced chamber. However, the junction of the present disclosure is not limited to being housed in a chamber.

As shown in FIG. 2a, an environmental fluid pressure $P_f$, which is the fluid pressure external to boot seal 4, acts uniformly on all exterior or exposed surfaces of boot seal 4, including where the end of boot seal 4 interfaces with outer surfaces of conductor 1 and nipple 5. In the absence of other factors, $P_f$ could result in fluid ingress under sleeve portions 4a, 4b. In other words, with no forces other than $P_f$ acting, fluid could work its way under sleeve portions 4a, 4b. However, there are other factors that keep that from happening. For example, there is a radially inwardly directed pressure $P_s$ on sleeve portions 4a, 4b, where $P_s$ is the "stretch" pressure of constrictive elastomeric rearward sleeve portion 4a upon conductor 1 and of forward sleeve portion 4b upon nipple 5. It is assumed for simplicity of this example that stretch pressure $P_s$ on conductor 1 and nipple 5 are equal, but the pressures need not be equal. The amount of stretch on conductor 1 and nipple 5 could be different. Stretch pressure $P_s$ adds to fluid pressure $P_f$ to keep sleeve portions 4a, 4b seated. Since $(P_f+P_s)>P_f$ in all cases, sleeve portion 4a, 4b will not be unseated by pressure $P_f$ no matter how great it becomes, and the seals will not fail in that mode. The same reasoning is true for many elastomeric boot seals, wherein there is adequate stretch to conformably press the sealing sleeve to the object over which it is stretched. Elastomeric boot seals like that shown in FIGS. 2a and 2b have limitations. For instance, protruding nipples 5 are typically fragile tubular extensions of the rigid dielectric material that makes up base portion 6 of connector 7. In handling, and during the conductor termination procedure, nipples 5 are easily damaged mechanically by side impacts that can crack them.

FIGS. 3a, 3b, and 3c illustrate one embodiment of the present disclosure. FIG. 3a shows an axial cross section of elongated body or "boot seal" 10 in position to be slid forward on cable 1 and further into place on connector 7. A forward portion of connector 7 has been cut away from FIGS. 3a and 3b for convenience of display. FIG. 3b shows the same axial cross-section of boot seal 10 installed in place within socket 12 of base portion 6 of connector 7. Socket 12 can extend at least slightly inwardly into terminal end face 12a of connector 7 to define a recessed portion. The radial cross-section of socket 12 can be in a variety of shapes, such as circular, ovular, square, rectangular, triangular, and the like. It is only required that boot seal 10 take on a form the same as or at least similar to that of the socket such that when installed into socket 12 it presses sealably against the wall or walls of socket 12.

Boot seal 10 of the present embodiment can be made from most any elastomer, such as neoprene, natural rubber, or silicone rubber that is chemically compatible with the fluids and other materials with which it is in contact. Boot seal 10 can include a passageway that extends through an entire length of boot seal 10 at least, generally parallel to the longitudinal axis of boot seal 10. The passageway can be designed to generally match an outer profile of cable 1 and/or connector terminal 9 of connector 7. In one embodiment, when boot seal 10 is not in use or is in a "relaxed" state, the passageway can have a cross-sectional area that is consistent throughout its length (see FIGS. 3a and 3b). In another embodiment, when boot seal 10 is not in use or is in a "relaxed" state, the passageway can have two or more cross-sectional areas, Stated differently, the passageway can have one or more diameters that are appropriate to fit the object(s) over which boot seal 10 extends.

Boot seal 10 can further include first sleeve portion 10a on rearward end thereof. At least first sleeve portion 10a of boot seal 10 can be constrictively stretched over conductor jacket 3 of cable 1, such that a portion of the passageway of boot seal 10 that extends through first sleeve portion 10a can have a cross-sectional area that is a least slightly less than the cross-sectional area of conductor jacket 3 in order to define a pressure fit. Boot seal 10 can further include second sleeve portion 10b on a forward end thereof. Second sleeve portion 10b can have a wall thickness that is greater than the wall thickness of first sleeve portion 10a. However, depending on the size and/or diameter of conductor jacket 3, connector terminal 9, and socket 12, second sleeve portion 10b need not have a wall thickness that is greater than the wall thickness of first sleeve portion 10a.

One end of first sleeve portion 10a can be integrally attached and/or continuously formed with one end of second sleeve portion 10b through known manufacturing techniques such as molding or the like. A length of first sleeve portion 10a, as measured along the longitudinal axis of boot sleeve 10, can be greater than a length of second sleeve portion 10b, as measured along the longitudinal axis of boot sleeve 10. A length or depth of socket 12, as measured along a longitudinal axis of connector 7, can be at least slightly greater than the length of second sleeve portion 10b, such that second sleeve portion 10b can fit entirely within socket 12.

Referring to FIG. 3b, as in the previous example of a prior-art boot seal, in the absence of other forces, an environmental fluid pressure $P_f$ external to boot seal 10 could have the effect of urging fluid under first sleeve portion 10a along its interface with conductor jacket 3 of cable 1 via potential leak path A. However, as in the prior-art example, there is an added seating pressure $P_s$ of first sleeve portion 10a against conductor jacket 3, where $P_s$ is the "stretch" pressure of constrictive elastomeric first sleeve portion 10a upon conductor jacket 3. The stretch pressure $P_s$ added to the external pressure $P_f$ keeps at least first sleeve portion 10a seated or fixedly attached. Since $(P_f+P_s)>P_f$ in all cases, there will be no pressure induced fluid intrusion along potential leak path A between first sleeve portion 10a and conductor jacket 3 no matter how great the fluid pressure.

Second sleeve portion 10b works differently from the boot seals of prior-art. For example, as shown in FIG. 3b, a cross-sectional area of second sleeve portion 10b can be sized such that second sleeve portion 10b conformably fits over connector terminal 9. The phrase "conformably fit" is broadly defined herein to mean a connection with no significant gaps between the components being connected. Connector terminal 9 is shown with its end coincident with the rear end-face of base portion 6 of connector 7; however, it could equally well extend rearwardly beyond the rear end-face of base portion 6 of connector 7, or even be somewhat recessed within socket 12 of connector 7. In one embodiment, second sleeve portion 10*b* can conformable fit to, but does not necessarily seal to, connector terminal 9. In another embodiment, second sleeve portion 10*b* can seal to connector terminal 9. An outer perimeter of second sleeve portion 10*b* can be sized and/or shaped so that when installed it is squeezed (at least slightly) between inner wall 11 of socket 12 and an outer surface of the connector terminal 9. An end of wire 2 can be joined to an end of connector terminal 9 in various common ways. For example, connector terminal 9 can include a feature, such as a socket, shaped to be electrically and mechanically attached to at least a portion of wire 2 by soldering or by crimping, thus making the electrical connection between connector terminal 9 and wire 2.

As shown in FIG. 3*a*, in the present embodiment bottom 13 of socket 12 plays an important role in the functionality of the design. For example, external pressure can push boot seal 10 inwardly into socket 12 until at least a portion of boot seal 10 contacts bottom 13 of socket 12. In other words, at least a portion of boot seal 10, such as a free end of second sleeve portion 10*b*, is configured to and/or capable of making direct contact and/or moving into direct contact with bottom 13 of socket 12 when pressure is applied and/or when the combination boot seal 10 and socket 12 are under pressure. The pressure from the environment helps to maintain that contact and sealably press boot seal 10 into socket 12.

Environmental fluid pressure $P_f$, in the absence of other factors, could unseat the outer surface of second sleeve portion 10*b* from inner wall 11 of socket 12 and fluid could intrude along potential leak path B. However, because second sleeve portion 10*b* is squeezed, at least slightly into socket 12, potential leak path B will remain sealed. In one embodiment, the combination can interact as follows: second seal portion 10*b*, being elastomeric, can be considered for all practical purposes to transmit environmental pressure $P_f$ uniformly throughout its body, so that a total pressure to seat the outer surface of second sleeve portion 10*b* against inner wall 11 of socket 12 is $(P_f+P_c)$, wherein $P_c$ is the pressure that comes from squeezing oversized second seal portion 10*b* into socket 12. Since $(P_f+P_c)>P_f$ in all cases, second sleeve portion 10*b* will not be unseated from inner wall 11 of socket 12 by fluid pressure $P_f$ no matter how great $P_f$ becomes. When sizing elastomeric components for high pressure applications or environments, as in the present embodiment, the material bulk modulus should be considered to account for its uniform compression.

In summary, there can be two leak paths possible, which could constitute failure modes of boot seal 10. One such path is potential leak path A between the outer surface of conductor jacket 3 and the inner surface of first sleeve portion 10*a*. A second such path is potential leak path B between inner wall 11 of socket 12, and the outer surface of second sleeve portion 10*b*. The presently disclosed technology blocks both of these potential leak paths.

Sealably squeezing second sleeve portion 10*b* into socket 12 can have at least one additional advantage. When second sleeve portion 10*b* is installed into socket 12, second sleeve portion 10*b* can be pneumatically restrained from entering by the air within socket 12 that it traps and compresses. That compression is easily relieved by inserting a small wire or pin along inner wall 11 of socket 12 before forcing second sleeve portion 10*b* into socket 12. As second sleeve portion 10*b* enters socket 12, the space around the wire or pin can provide an exit route for the otherwise trapped air. When boot seal 10 is in place, the wire or pin can be withdrawn, and no more than a negligible about of air remains entrapped in socket 12. Once installed, any attempt to withdraw second seal portion 10*b* from socket 12 will be resisted by suction at a base of socket 12. The force required to displace boot seal 10 from its position increases with increasing fluid pressure, which means that in the ocean it remains more firmly in place as its submerged depth increases. Furthermore, as opposed to prior-art boot seals, boot seal 10 of the present embodiment has the advantage of having no exposed forward lip 13 (FIG. 2*a*) that is vulnerable to being accidently peeled back out of place.

Figure 4A:
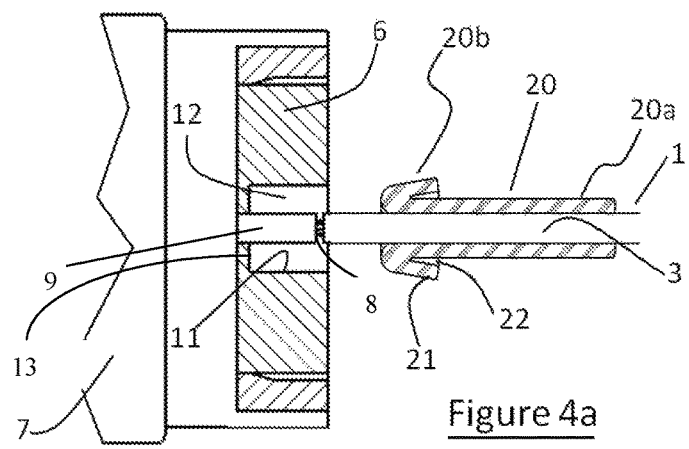
FIG. 4a and FIG. 4b are partial axial section views of a boot seal disposed within a connector terminal-end socket according to a second embodiment of the present disclosure.
Figure 4B:
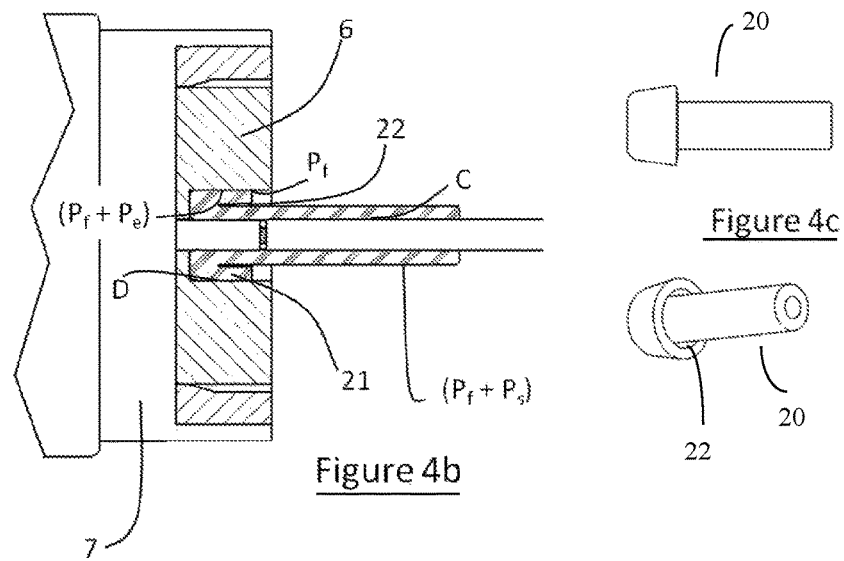
Figure 4C:
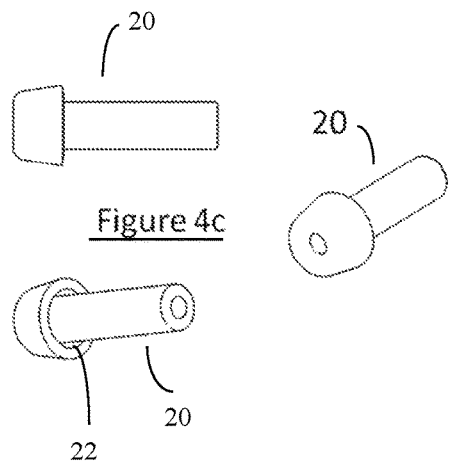
FIG. 4c illustrates various perspective views of a second embodiment of the boot seal of the present disclosure.

FIGS. 4*a*, 4*b*, and 4*c* illustrate a second embodiment of the present disclosure, wherein features similar to those of the first embodiment are shown with like reference numerals throughout. Description of certain features similar to the two embodiments may be omitted herein for convenience and brevity. FIG. 4*a* shows an axial cross section of boot seal 20 in position to be slid forward on conductor or cable 1 and further fully into socket 12 of connector 7. The forward portion of connector 7 has once again been cut away for convenience of display. FIG. 4*b* shows the same axial cross-section of boot seal 20 installed in place within socket 12 of base portion 6 of connector 7. FIG. 4*c* shows various perspective views of boot seal 20.

As in previous examples, boot seal 20 can be made from most any elastomer, such as neoprene, natural rubber, or silicone rubber that is chemically compatible with the fluids and other materials with which it is in contact. Boot seal 20 can include first sleeve portion 20*a* on its rearward end which is constrictively stretched over conductor jacket 3 of cable 1. Boot seal 20 can further include second sleeve portion 20*b* on its forward end. An outer periphery of second sleeve portion 20*b* can have a frusto-conical shape (see FIG. 4*c*). Second sleeve portion 20*b* can extend radially outwardly from a longitudinal axis of boot seal 20 further than first sleeve portion 20*a*.

One end of first sleeve portion 20*a* can be integrally attached and/or continuously formed with one end of second sleeve portion 20*b*. A length of first sleeve portion 20*a*, as measured along the longitudinal axis of boot sleeve 20, can be greater than a length of second sleeve portion 20*b*, as measured along the longitudinal axis of boot sleeve 20. A length or depth of socket 12, as measured along a longitudinal axis of connector 7, can be at least slightly greater than the length of second sleeve portion 10*b*, such that second sleeve portion 10*b* can fit entirely within socket 12.

As in the example of a prior-art boot seal illustrated in FIG. 2*a*, in the absence of other forces the environmental fluid pressure $P_f$ external to boot seal 20 could have the effect of forcing fluid via potential leak path C (see FIG. 4*b*) along the interface between second sleeve portion 20*a* and jacket 3 of cable 1. However, as in the prior-art example, there is an additional radially inwardly directed pressure $P_s$ of first sleeve portion 20*a* against conductor jacket 3, where $P_s$ is the "stretch" pressure of constrictive elastomeric first sleeve portion 20*a* upon conductor jacket 3. Stretch pressure $P_s$ adds to external pressure $P_f$ to keep first sleeve portion 20*a* seated or sealed. Since $(P_f+P_s)>P_f$ in all cases, first sleeve portion 20*a* will not be unseated from conductor jacket 3 by external pressure $P_f$, and there will be no fluid intrusion along potential leak path C between first sleeve portion 20*a* and conductor jacket 3 no matter how great the fluid pressure.

Referring again to FIGS. 4*a*, 4*b*, and 4*c*, second sleeve portion 20*b* works differently than prior-art boot seal sleeves, and somewhat differently than the first embodiment described in FIGS. 3a, 3b, and 3c. Second sleeve portion 20b can include radially outwardly flared lip 21, thereby leaving gap or space 22 between a radially inward surface of lip 21 and an exterior portion of first sleeve portion 20a. Lip 21 can be resilient and can be biased radially outwardly away from a longitudinal axis of boot seal 20 (e.g., extending generally perpendicularly to the longitudinal axis of boot seal 20 or at an angle from the longitudinal axis and toward first sleeve portion 20a). Lip 21 can be pressed or folded axially backwards or toward a longitudinal axis of cable 1. An outer diameter of second sleeve portion 20b at lip 21 can be sized to be at least slightly greater than a diameter of socket 12. When second sleeve portion 20b is inserted in socket 12, lip 21 can therefore be elastically deformed radially backward and inwardly by inner wall 11 of socket 12, thus forming a seal between an exterior surface of lip 21 and inner wall 11, as shown in FIG. 4b.

As with the first embodiment of the present disclosure, some air may be trapped within socket 12 as boot seal 20 enters. In the case where lip 21 is sized so as not to be squeezed tightly against first sleeve portion 20a of boot seal 20, air within socket 12 can escape past lip 21 by simply springing it further backwards. If lip 21 is tightly squeezed against first sleeve portion 20a of boot seal 20 when inserted into socket 12, then, as in the case of the first embodiment of the present disclosure, a small wire or pin can be temporarily inserted into socket 12 to relieve the entrapped air. By virtue of its elasticity, lip 21 of boot seal 20 will be elastically deformed radially inwardly as it is inserted into socket 12. The elastomeric restoring force of lip 21 can cause an elastic pressure $P_e$ to be exerted against inner wall 11 of socket 12. Environmental pressure $P_f$, in the absence of other forces, could have the effect of causing fluid ingress along the interface between lip 21 of boot seal 20 and inner wall 11 of socket 12. But lip 21 can have an elastic seating pressure $P_e$ acting to keep it pressed against inner wall 11 of socket 12. Since $(P_f+P_e)>P_f$ in all cases, lip 21 will not be unseated from inner wall 11 no matter how great $P_f$ becomes, and fluid will not ingress along path D between inner wall 11 and the exterior surface of lip 21.

As with the first described embodiment of the present disclosure, once installed, any attempt to withdraw second sleeve portion 20b from socket 12 will be resisted by suction at a base of socket 12. The force required to displace boot seal 20 from its position increases with increasing fluid pressure, which means that in the ocean it remains more firmly in place as its submerged depth increases. Furthermore, as opposed to prior-art boot seals, boot seal 20 has the advantage of having no exposed forward edge 13 (see FIG. 2a) that is vulnerable to being accidently peeled back out of place.

There are some applications which favor the use of the first embodiment of the present disclosure illustrated in FIGS. 3a, 3b, and 3c over the second embodiment of the present disclosure illustrated in FIGS. 4a, 4b, and 4c. Boot seal 10 of the first embodiment can be used in the case where, for one reason or another, the diameter of socket 12 exceeds the diameter of connector terminal 9 by only a small amount. The flared-lip design of boot seal 20 of the second embodiment shown in FIGS. 4a, 4b, and 4c can require a larger diameter socket 12 than does the first embodiment shown in FIGS. 3a, 3b, and 3c. That is because there are practical lower limits to the wall thickness of any elastomeric boot-seal sleeves. Boot seal sleeves with walls less thick than about 0.05 inches are not robust enough to be reliable in some applications. That means that for some applications employing the second described embodiment the radial distance between the outer diameter of connector terminal 9 and the diameter of socket 12 would have to be on the order of approximately 0.10 inches (two minimum wall thicknesses: one for the sleeve wall and one for the lip) to accept lip 21 of the second embodiment, even if it were completely folded back upon first sleeve portion 20a. Because boot seal 10 of the first embodiment does not have to fold back upon itself, second sleeve portion 10b can have a wall thickness that exceeds the outer diameter of connector terminal 9 by not much more than approximately 0.05 inches (a little more than one minimum wall thickness), thereby allowing second sleeve portion 10b to be used with smaller sockets 12 than the second embodiment can fit into. That difference may seem small or insignificant, but the space on the rear end of connectors is often very restricted, making small differences important.

When employing boot seal 10 of the first embodiment, elastomer second sleeve portion 10b can be squeezed by an interference fit into socket 12. Second sleeve portion 10b must be of a small enough diameter that allows it to be installed, but of a large enough diameter to be firmly squeezed against inner wall 11 of socket 12 when fully in place. In other words, there are relatively tight tolerances that must be held on second sleeve portion 10b and socket 12 diameters for the seal to inner wall 11 to be effective. That is not the case when the second embodiment of the present disclosure illustrated in FIGS. 4a, 4b, and 4c is employed. When boot seal 20 is installed, lip 21, which can have an outer diameter that is at least slightly larger than the inner diameter of socket 12, is elastically sprung radially inwardly to seal against inner wall 11 of socket 12. However, because lip 21 can have a wide radial margin in which it can be sprung inward and still be effective, it does not have to be closely sized to socket 12. The reduced requirement for exact sizing means a reduced chance of misfit errors, and a wider use range for the second disclosure of the present embodiment as compared to the first embodiment. In addition, in most applications, the second embodiment can be installed without the need for a thin pin or wire to relieve the air within socket 12.

In one embodiment, at least a segment or the entirety of second sleeve portion 10b, 20b can be of the same size and/or diameter as at least a portion of first sleeve portion 10a, 20a. Alternatively, at least a segment of second sleeve portion 10b, 20b can have a size and/or diameter that is at least slightly smaller than at least a portion of first sleeve portion 10a, 20a. Such a configuration can help, for example, to make boot seal 10, 20 easier to grasp or control. The dimensions of socket 12, such as diameter, length and/or the like can vary based on the design needs.

Connector 7, like other elements of the presently disclosed technology, is not limited to the size, shape and/or configuration shown and described herein. Instead, connector 7 can have various characteristics, sizes, shapes and/or configurations. For example, connector 7 is not limited to the inclusion of a single socket 12 and a single connector terminal 9. Instead, connector 7 can include two or more spaced-apart sockets 12, each having connector terminal 9 as described in detail above. Alternatively, a single socket 12 can include two or more spaced-apart connector terminals 9, each of which can engage and/or receive a single wire 2. Two or more connector terminals 9 can be of different or varying shapes, sizes and/or configurations, which can engage and/or receive wire 2 of a corresponding shape, size and/or configuration. In such an embodiment, individual boot seals 10, 20 can have a corresponding shape, size and/or configuration. The connection between connector 7 and conductor 1 can be electrical, pneumatic, optical, fluid or other types. Wire 2 can be in various forms, such as stranded or a solid conductor, and various insulators or insulating materials can be used to form jacket 3. Materials used to form one or more components of the presently disclosed technology can be based on the pressure requirements of the environment and/or other characteristics.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the presently disclosed technology and are therefore representative of the subject matter which is broadly contemplated by the presently disclosed technology. It is further understood that the scope of the presently disclosed technology fully encompasses other embodiments that may become obvious to those skilled in the art and that the scope of the presently disclosed is accordingly limited by nothing other than the appended claims.

What is claimed is:

1. A system configured to sealably enclose a junction, the system comprising:
    a connector including a recessed socket defined therein and a connector terminal disposed at least partially within the socket, the connector terminal being configured to make contact with at least a portion of a conductor to form the junction; and
    a seal having an elongated body with a first sleeve portion, a second sleeve portion, and a passageway extending through the seal along a longitudinal axis of the seal, the passageway having a uniform diameter throughout a full length of the body, the first sleeve portion being located at a rear end of the elongated body and the second sleeve portion being located at a front end of the elongated body, an outer periphery of the second sleeve portion extending away from the longitudinal axis further than any portion of an outer periphery of the first sleeve portion, at least the second sleeve portion being configured to conform to at least a portion of the connector terminal of the connector, at least the first sleeve portion being configured to constrictively stretch over at least a portion of the conductor, at least a portion of the second sleeve portion being configured to sealably fit into the socket of the connector, and an entire front surface of the second sleeve portion being configured to contact a bottom of the socket when pressure is applied.

2. The system of claim 1, further comprising a conductor, wherein the conductor includes a wire at least partially within an insulating jacket, and wherein the connector terminal is configured to make contact with at least a portion of the wire.

3. The system of claim 1, wherein the outer periphery of the second sleeve portion is at least slightly larger than an inner periphery of the socket.

4. The system of claim 1, wherein the second sleeve portion includes a radially outwardly flared lip.

5. The system of claim 4, wherein the lip is biased radially outwardly away from a longitudinal axis of the body.

6. The system of claim 5, wherein the lip is pressed radially inwardly toward the longitudinal axis of the body when the second sleeve portion is inserted into the socket of the connector.

7. The system of claim 1, wherein the connector includes an end face, the socket extending inwardly into the end face of the connector.

8. The system of claim 1, wherein the seal is formed of an elastomer.

9. The system of claim 1, wherein the connector includes an exposed surface, the socket being a recessed portion defined in the exposed surface.

10. A system configured to sealably enclose a junction, the system comprising:
    a conductor including a wire at least partially within an insulating jacket;
    a connector including a recessed socket defined therein and a connector terminal disposed at least partially within the socket, the connector terminal being configured to make contact with at least a portion of the conductor to form the junction; and
    a seal having an elongated body with a first sleeve portion, a second sleeve portion, and a passageway extending through the seal along a longitudinal axis of the seal, the passageway having a uniform diameter throughout a full length of the body, the first sleeve portion being located at a rear end of the elongated body and the second sleeve portion being located at a front end of the elongated body, an outer periphery of the second sleeve portion extending away from the longitudinal axis further than any portion of an outer periphery of the first sleeve portion, at least a portion of the first sleeve portion constrictively stretched over at least a portion of the conductor, at least a portion of the second sleeve portion conformably fitting over at least a portion of the connector terminal of the connector, and at least a portion of the second sleeve portion being configured to sealably fit into the socket of the connector, and an entire front surface of the second sleeve portion being configured to contact a bottom of the socket when pressure is applied.

11. The system of claim 10, wherein the entire second sleeve portion sealably fits within the socket of the connector.

12. The system of claim 10, wherein the second sleeve portion includes a radially outwardly flared lip, and wherein the lip is pressed radially inwardly toward a longitudinal axis of the body when the second sleeve portion is inserted into the socket of the connector.

13. A system configured to sealably enclose a junction, the system comprising:
    a seal having an elongated body with a first sleeve portion, a second sleeve portion, and a passageway extending through the seal along a longitudinal axis of the seal, the passageway having a uniform diameter throughout a full length of the body, the first sleeve portion being located at a rear end of the elongated body and the second sleeve portion being located at a front end of the elongated body, an outer periphery of the second sleeve portion extending away from the longitudinal axis further than any portion of an outer periphery of the first sleeve portion, at least the second sleeve portion being configured to conformably fit over at least a portion of a connector terminal of a connector and at least the first seal portion being configured to sealably stretch over at least a portion of a conductor, at least a portion of the second sleeve portion being configured to sealably fit into a socket that forms a recess in the connector, and an entire front surface of the second sleeve portion being configured to contact a bottom of the socket when pressure is applied.

14. The system of claim 13, wherein the conductor includes a wire at least partially within an insulating jacket, and wherein the connector terminal is configured to make contact with at least a portion of the wire.

\* \* \* \* \*